United States Patent [19]
Viswanathan

[11] 3,955,188
[45] May 4, 1976

[54] ENCODING TECHNIQUE FOR ENABLING A DEVICE TO PROCESS DIFFERENT TYPES OF DIGITAL INFORMATION TRANSMITTED ALONG A SINGLE INFORMATION CHANNEL

[75] Inventor: G. R. Viswanathan, Troy, N.Y.

[73] Assignee: Honeywell Information Systems Inc., Waltham, Mass.

[22] Filed: Apr. 8, 1974

[21] Appl. No.: 458,145

Related U.S. Application Data
[62] Division of Ser. No. 103,409, Jan. 4, 1971.

[52] U.S. Cl. .......................... 340/324 AD; 340/206
[51] Int. Cl.² ........................................... G06F 3/14
[58] Field of Search ........... 340/324 AD, 206, 168 S

[56] References Cited
UNITED STATES PATENTS

| | | |
|---|---|---|
| 3,500,327 | 3/1970 | Belcher et al. ................ 340/324 AD |
| 3,559,207 | 1/1971 | Atkinson ..................... 340/324 AD |

Primary Examiner—Marshall M. Curtis
Attorney, Agent, or Firm—Faith F. Driscoll; Ronald T. Reiling

[57] ABSTRACT

A data processing system includes a first device which transmits different types of pulse coded digital information along a single channel to a second device for separation and distribution to a number of different outputs. The different types of digital information transmitted are encoded with different pulse widths. The pulse widths for the different types of information are selected to provide highly reliable data transmission. The second device includes a receive section which has a plurality of detectors. Each of these detectors operate to detect only the pulse coded digital information encoded with predetermined pulse widths and pass them to its output. The system accommodates bidirectional transmission and processing of the encoded digital information by including like transmit and receive sections within each device.

13 Claims, 7 Drawing Figures

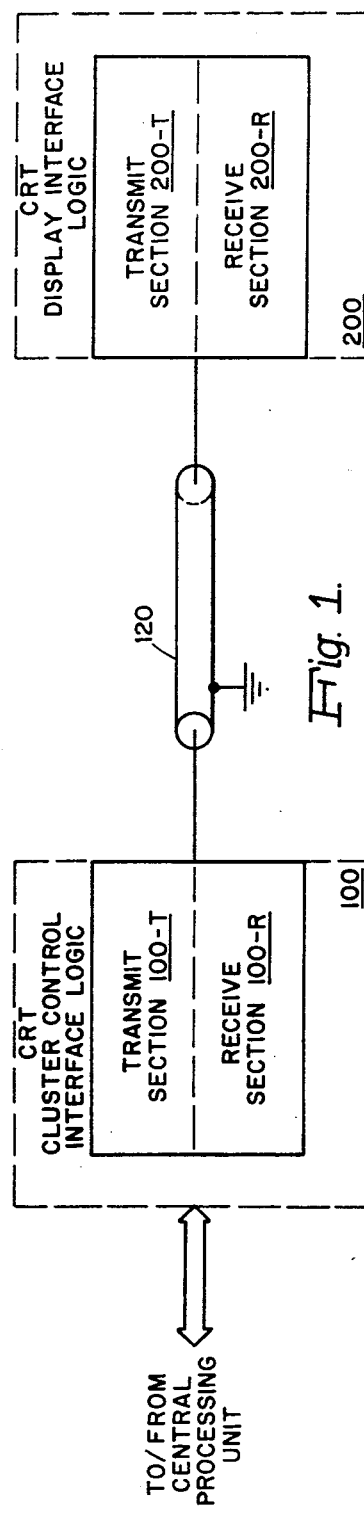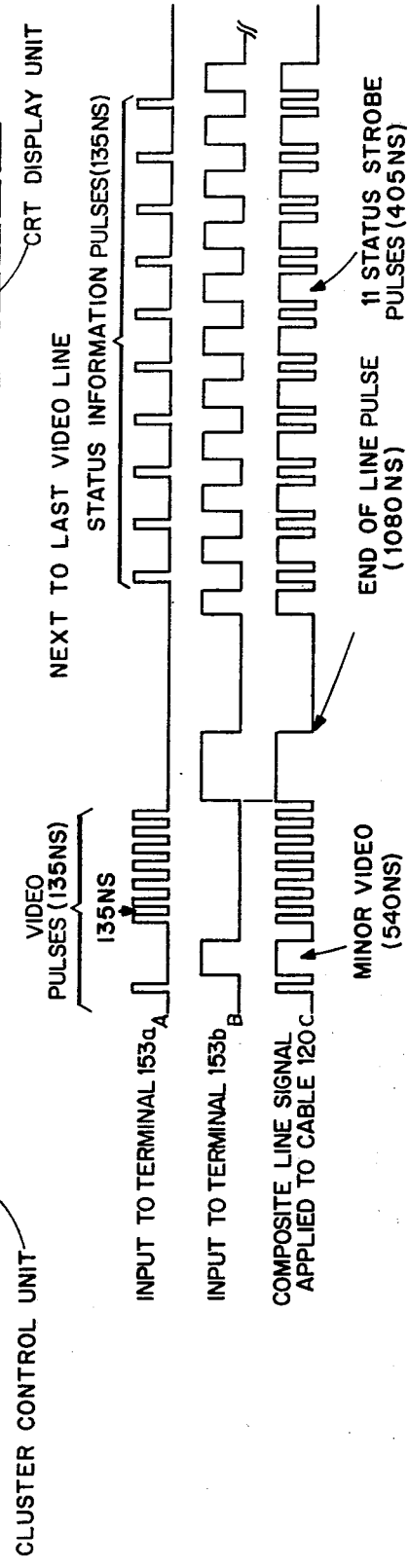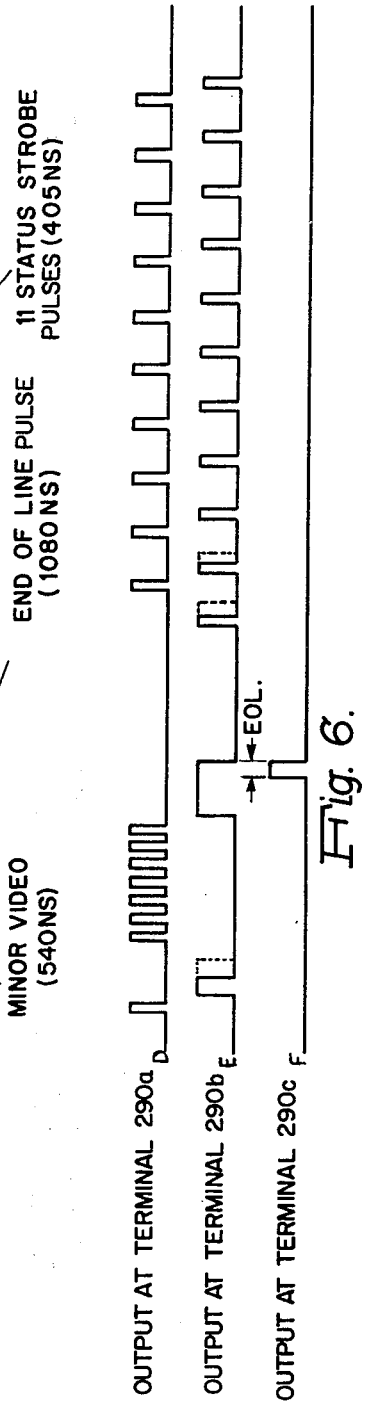

ENCODING TECHNIQUE FOR ENABLING A DEVICE TO PROCESS DIFFERENT TYPES OF DIGITAL INFORMATION TRANSMITTED ALONG A SINGLE INFORMATION CHANNEL

This is a division of application Ser. No. 103,409, filed Jan. 4, 1971.

BACKGROUND OF THE INVENTION

1. Field of Use

This invention relates to data processing systems and more particularly to methods and apparatus for transferring different types of digital information between two devices for processing by them and for controlling their operation.

2. Prior Art

In systems in which a control device is located remotely from the device or devices it communicates with, a transmission network normally serves to interconnect these devices for transmitting and receiving information. The transmission network is usually by far the most expensive element in the system. This is particularly true when the network is required to accommodate the devices of a system which exchange different types of digital information for status and controlling purposes. An example of such a system is a cathode ray tube (CRT) display system in which a control device is required to service a plurality of display units. Normally, the device or "cluster" control unit is arranged to transmit and receive digital information to/from a data processing unit, as for example, a computer. The cluster control unit then processes the information, stores it, and thereafter forwards the information to the individual display units.

The "cluster" unit includes logic for editing the information it receives from each of the display units, storage for each of the display units, timing and character generation logic circuits for these units. In this arrangement, the transmission network is required to transmit control and video information from the "cluster" unit to display unit. And, where the display unit includes a keyboard for data entry, the transmission network is required to also transmit keyboard generated data and control signals from the display unit to the cluster unit.

Some prior art system have provided individual transmission networks for transmitting each of the different types of information. These systems have proved extremely expensive and normally require considerable space for housing the many multiconductor cables and lines.

Other prior art systems have employed a number of different DC voltage levels for each of the different types of information. These systems have found to be unsatisfactory in that they require threshold devices which are able to detect a number of different -levels. Also, these devices have been found to be less reliable where the device is required to recognize more than two different voltage levels. Specifically, when the circuits are required to recognize several different voltage levels, they become more susceptible to noise and other disturbances. This in turn renders the system more susceptible to errors and less reliable. Further, these systems have not been found to be readily adaptable for bidirectional transmission.

Accordingly, it is an object of the present invention to provide a technique for communicating different types of digital information.

It is therefore another object of the present invention to provide a transmission system of approved quality.

It is still another object of the present invention to provide a communication system which reduces the number of conductors required for transmitting different types of digital information signals and is highly reliable.

It is a more specific object of the present invention to provide a low cost system for interconnecting a pair of devices for bidirectional transfer of different types of digital information.

It is still a more specific object of the present invention to provide as arrangement for interconnecting a CRT control unit to a CRT display unit for bidirectional transmission of pulse coded video information, and control signals therebetween.

SUMMARY OF THE INVENTION

The above and other objects are provided according to the basic concept of the invention through a method and apparatus for interconnecting a pair of devices by a single cable. Each device includes a trnsmit section which when conditioned to transmit, applies different types of digital information selectively encoded with different pulse widths to the cable. And, each device includes a receive section which when conditioned to receive, separates the different types of originally transmitted digital information on the basis of pulse widths. The receive section thereafter applies the different types of digital information to predetermined outputs for further processing by the device. That is, the device applies digital information encoded with predetermined pulse widths to certain outputs.

In more particular terms, the receive section includes logic means for measuring the time duration of the transmitted digital information of varying pulse width and removing the original digital information therefrom. This logic means includes a number of pulse width detectors. Each of these detectors is arranged to be responsive only to digital pulse coded signals selected from predetermined frequency bands. Therefore, each detector generates an output only in response to digital information which is pulse width modulated so as to correspond to the detector's frequency band. In the illustrated embodiment the digital information is further separated by connecting two detectors in series.

The invention accommodates bidirectional transmission between devices by arranging each device to include like receive and transmit sections. A feature of the invention is that it minimizes the complexity of the receive section. All of the detectors are arranged to share a common delay element for deriving the time duration of the digital information signals. Also, the invention further minimizes circuit complexity by connecting the input of a detector to the output of a preceding detector to achieve further separation.

The above and other objects of the present invention are achieved in an illustrative embodiment described hereinafter. The novel features which are believed to be characteristic of the invention, both as to its organization and method of operation, together with further objects and advantages thereof will be better understood from the following description considered in connection with the accompanying drawings. It is to be expressly understood, however, that these drawings are for the purpose of illustration and a description only and are not intended as a definition of the limits of this invention.

BRIEF DESCRIPTION OF THE DRAWINGS

FIG. 1 is a diagramatic illustration of the data processing system embodying the principles of the present invention;

DESCRIPTION OF THE ILLUSTRATIVE EMBODIMENT

FIG. 1 shows a data processing system which incorporates the principles of the present invention. As illustrated by FIG. 1, the system comprises first and second devices which correspond respectively to a cathode ray tube (CRT) cluster control unit 100 and cathode ray tube (CRT) display unit 200. Each device includes a transmit section and receive section for transmitting and receiving of digital information along the twisted pair cable 120.

Figure 2:
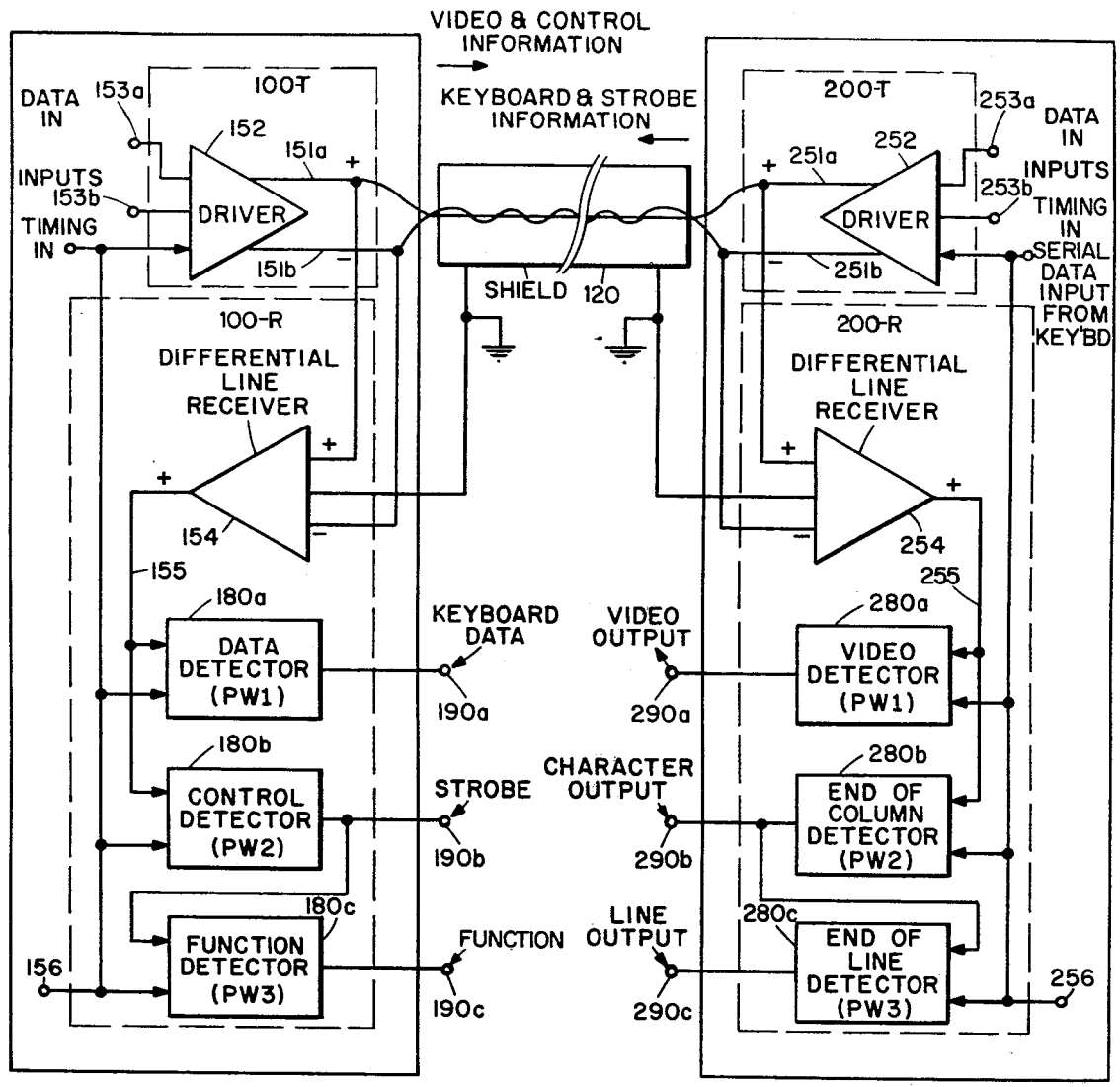
FIG. 2 is a block diagram of the receive and transmit sections included within the system of FIG. 1.

FIG. 2 illustrates the transmit and receive sections of units 100 and 200 in block form. As shown, each of the transmit sections 100-T, and 200I, comprise digital driver circuit 152 and 252 respectively for applying two level digital information signals to a pair of terminals 151a, 151b, 251a, 251b of the cable 120. A shielded twisted conductor pair provides the desired pulse width transmission characteristics for the cable 120.

Transmission along cable 120 is bidirectional; that is, half duplex. As further described herein, control information and video information are transmitted from control unit 100 to the CRT units and during predetermined time periods, timing information accompanied by keyboard generated data are transmitted from the CRT unit 200 to the cluster control unit 100.

Figure 4:
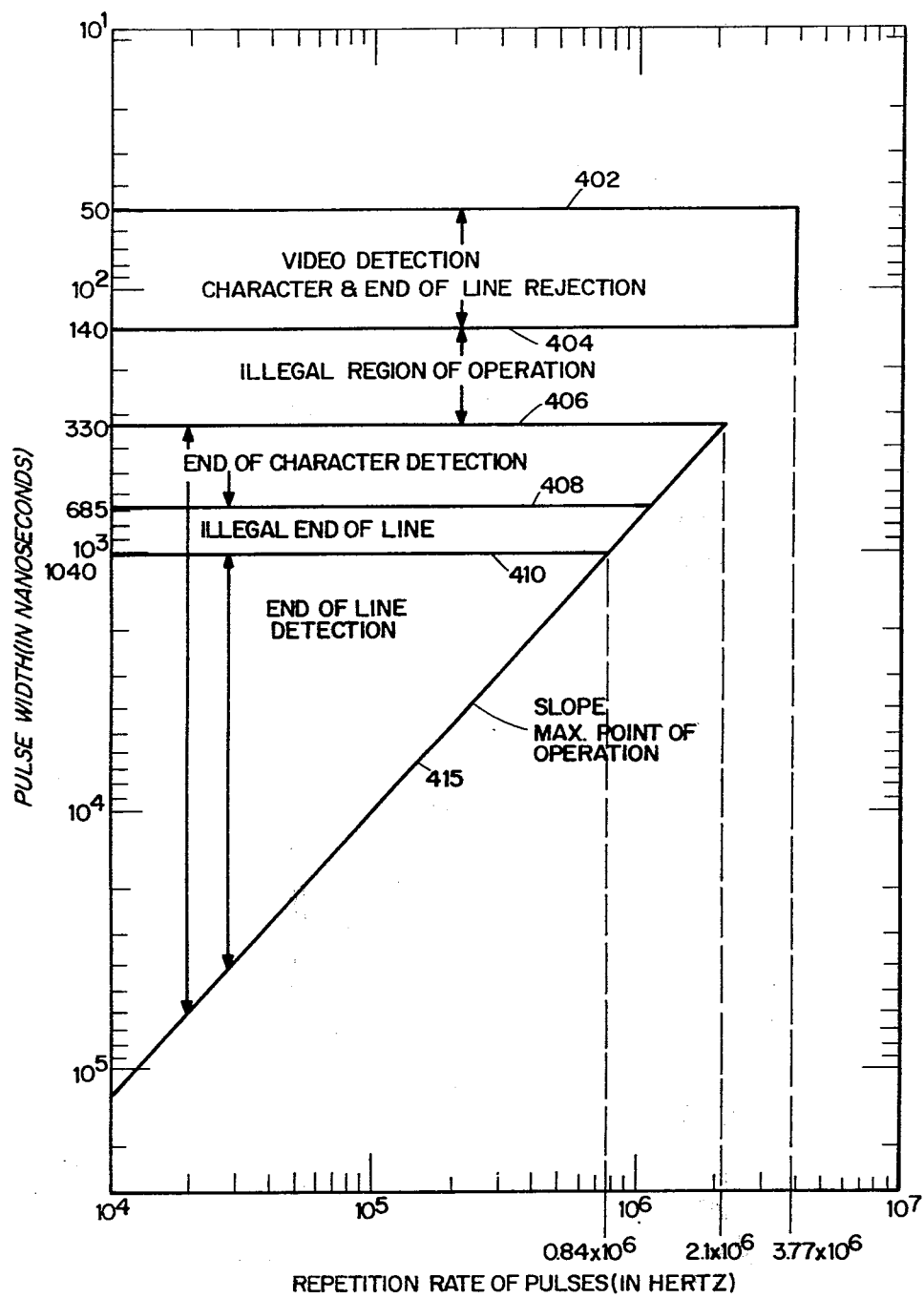
FIG. 4 is a chart which illustrates the operating bands of the detector circuits of FIGS. 2 and 3.

The different types of digital information are encoded with different types of digital information and these correspond to those listed in the table herein.

lar, the graph of FIG 4 has its horizontal axis and vertical axis respectively labeled in terms of the pulse repetition rates and pulse widths respectively expressed in units of frequency and nanoseconds respectively. The horizontal lines 402, 404, 406, 408 and 410 together with the line 415 designate the minimum and maximum repetition rates and pulse widths for reliable operation of the three detectors of the present embodiment. These operating regions are further described herein relative to their particular detector.

Each of the receive sections 100-R and 200-R comprise differential line receiver circuits 154 and 254, and a plurality of detectors connected as show in FIG. 2. Considering the operation of one logic interface briefly, (i.e. unit 100), the driver 152 "OR'S" a number of inputs including a data input and a timing input respectively applied to terminals 153a and 153b. In response thereto, a driver 152 generates complementary output signals to terminals 151a and 151b when enabled by an appropriate control logic level from line 156 from the device associated therewith. When the logic level applied line 156 is low (i.e. a binary ZERO), the control logic unit 100 operates as a transmitter with driver circuit 152 enabled. At the same time, the detectors of the receive section are disabled. Alternatively, when the logic signal level applied to line 156 is high (i.e. a binary ONE), it enables each of three detectors 180a, 180b and 180c to pass signals from the line receiver 154. At the same time, the high logic level disables driver circuit 152 from transmitting.

As illustrated by FIG. 2, the detectors 180a, 180b and 180c are arranged to pass digital information signals to at least three output points which correspond to terminals 190a, 190b and 190c. Digital signals are present at these output terminals depending upon the type of digital information each of the detectors 180a through 180c are arranged to pass. For example, as shown by the previous table, detector 180a will pass digital information generated from a keyboard which is encoded to have pulse widths having a nominal value of 135 nanoseconds. However, detector 180b only will pass control information in the form of timing signals encoded to have nominal pulse widths of 330 nanoseconds in addition to digital information signals which may specify one or more special functions encoded to have nominal pulse widths of 1040 nanoseconds. And, detector 180c will pass only digital information signals of 1040 nanosecond pulse widths or greater.

It will be noted that unit 200 has an arrangement similar to that of unit 100. However, as illustrated by

TABLE

| DESIGNA-TION | TYPE OF INFORMATION | PULSE WIDTH MIN | MAX | PULSE REP. RATE MIN | MAX |
|---|---|---|---|---|---|
| PW1 | Video (Alpha/Numeric Data) Signals | 50ns | 140ns | — | 3.77MHz |
| PW2 | End of Column (Keyboard Strobe) Signals | 330ns | no limit | — | 2.1MHz |
| PW3 | End of Line (Special Functions) Signals | 1040ns | no limit | — | 840 KHz |

The various bands in which the detectors of the present embodiment operate to detect the encoded digital information pulses are illustrated in FIG. 4. In particular, the previous table, the various pulse widths define different types of digital video information utilized by the CRT units. The detector 280a will pass bits of video information encoded to have nominal pulse widths of 135 nanoseconds. The detector 280b will pass end of column video control information pulses encoded to have nominal pulse widths of 330 nanoseconds. And, detector 280c will pass only the End of Line pulse. The significance of these types of digital information will be discussed in greater detail in connection with a description of system operation presented herein with reference to FIG. 6.

Transmit Section

Figure 3A:
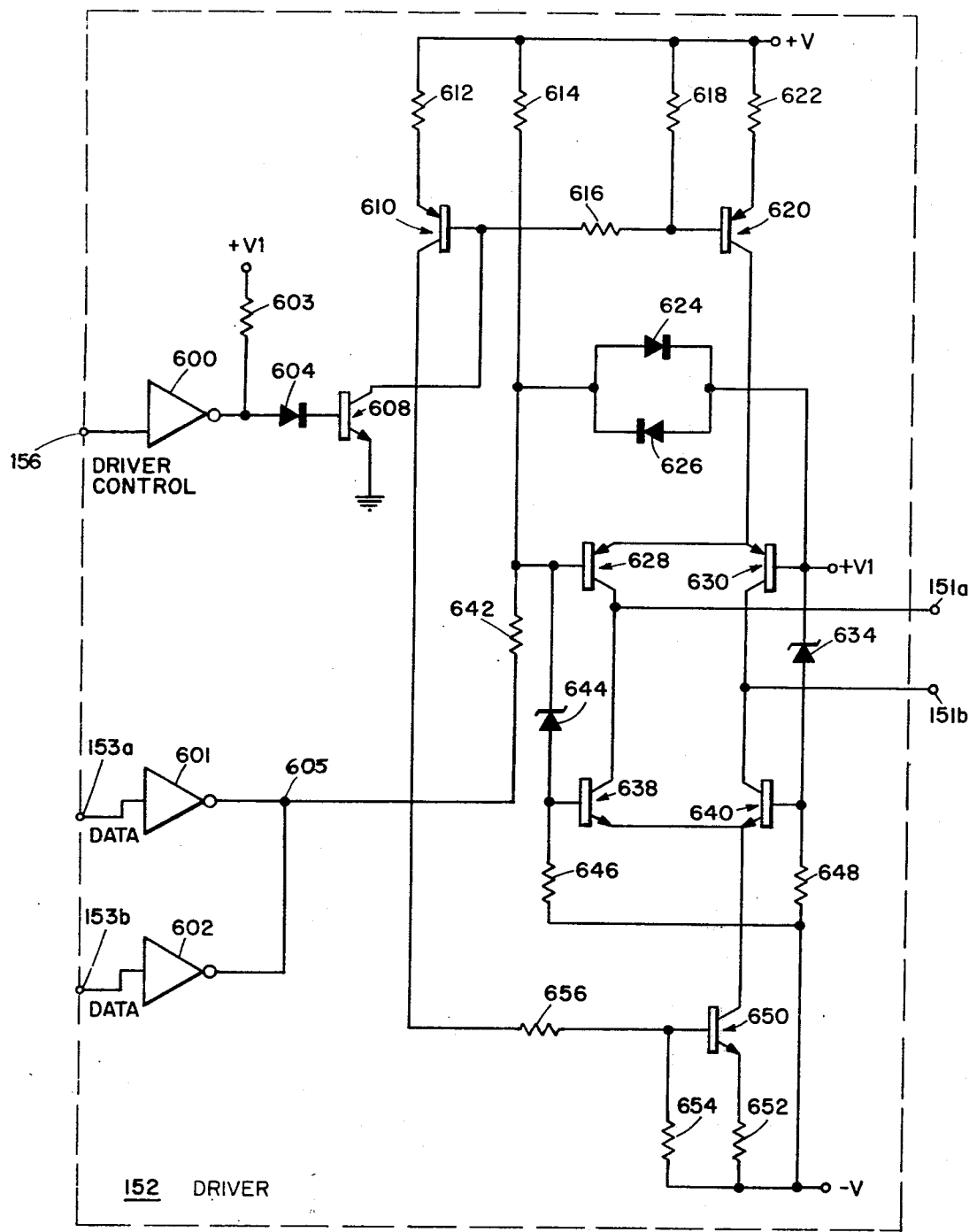
FIG. 3a shows in greater detail the transmit section of FIG. 2.

FIG. 3a shows in greater detail, the transmit section 100T of unit 100. Since the transmit section 200T of unit 200 is the same as the transmit section 200T, it will not be described herein.

The driver circuit 152, as shown, comprises two pairs of transistors 628, 630 and 638, 640 with their emitter electrodes connected in common to the collector electrodes of a current source and current sink transistors respectively.

The current source includes a PNP transistor 620 which has its emitter electrode connected through an emitter resistor 622 to a positive voltage source (+V) applied to a termiinal labeled +V. The base electrode of the transistor 620 connects to the same positive voltage through a resistor 618.

The current sink includes a NPN transistor 650 which has its emitter electrode connected through an emitter resistor 652 to a negative voltage source (−V) applied to a terminal labeled −V. The base electrode of the transistor 650 connects to the same voltage through a resistor 654.

The base electrodes of both the current source and current sink connect to an enabling line 156 through inverter amplifier 600 and inverter transistor 608. The base electrode of transistor 608 connects through a diode 604 to the output terminal of the inverter 600 which also connects through a load resistor 603 to a positive voltage applied to terminal +V1. The emitter electrode of transistor 608 connects to ground and its collector electrode connects in common with the base electrode of a transistor 610 through series connected resistors 616 and 618 to the positive voltage source (+V) applied to terminal +V. And, the emitter and collector electrodes of the transistor 610 connect to the voltage source +V and the base electrode of transistor 650 respectively through emitter resistor 612 and collector load resistor 656.

Considering the PNP and NPN transistor pairs in greater detail, it is noted that the base electrodes of PNP transistors 628 and 630 connect to opposite sides of a parallel diode network consisting of diodes 624 and 626. Additionally, the base electrode of the transistor 628 connects in common with its side of the diode network to the voltage source, +V, through a resistor 614. The base electrode of the transistor 630 connects in common with its side of the diode network to a positive voltage source +V1.

The base electrodes of NPN transistors 638 and 640 connect through first and second like zener diodes 644 and 634 respectively to the base electrodes of the transistors 628 and 630. Additionally, the base electrodes of the NPN transistors 638 and 640 connect in common with the anodes of their respective zener diodes to the voltage source −V through resistors 646 and 648 respectively.

The collector electrodes of transistors 628 and 638 as well as the collector electrodes of the transistors 630 and 640 connect as shown and the junctions formed thereby connect to the output terminal 151a and 151b.

The input data signal levels applied to terminals 153a and 153b are inverted by the inverter amplifiers 601 and 602 respectively and applied to common junction 605. The input signal levels are then applied through a resistor 642 to the base electrodes of the PNP and NPN transistor pairs.

In operation, the driver circuit 152 is enabled when low voltage level or binary ZERO is applied to terminal 156. In particular, when signal level applied to the terminal 156 is a ZERO, the output level of the inverter amplifier 600 is forced high or to a ONE which switches transistor 608 into conduction sufficient to force it into saturation. Accordingly, the voltage level at its collector electrode is forced low towards zero volts. This causes both transistors 610 and 620 to conduct. The transistor 610 when conductive supplies current to the base electrode of the transistor 650 switching it into conduction. The value of current flowing through each of the transistors 620 and 650 is determined by the resistive values of the emitter resistors 622 and 652 respectively and the volage developed there across which will be established by the voltage signal levels applied to their base electrodes. As shown, the voltage level applied to the base electrode of transistor 620 will be determined by the resistive voltage divider consisting of resistors 616 and 618. And, the voltage level applied to the base electrode of transistor 650 is determined by the value of current through transistor 610 and the resistance value of resistor 654.

From the above, it will be noted that when the voltage signal level at the terminal 156 is high or a binary ONE, the output of the inverter 600 is forced low or to a binary ZERO which renders inverter transistor 608 non-conductive. This in turn places the collector electrode of transistor 608 at a high signal level or ONE which inhibits both the transistors 610 and 620 from conducting. Thus, the transistors 610, 620, and 650 are all non-conductive. Accordingly, the driver 152 does not apply output voltage levels to the terminals 151a and 151b.

Now, when the driver circuit 152 is enabled by a binary ZERO logic level applied to line 156, both transistors 620 and 650 are conducting. Initially, it is assumed that the input levles to terminals 153a and 153b are both ZEROS. When the level to one of the terminals is forced high or to a ONE, the inverter associated therewith forces the level at junction 605 low which permits current to flow through the resistor 642. The value of resistance for resistor 642 is selected to be less than the value for resistor 614 so that the voltage level applied to the cathode electrode of the diode 626 is less positive than that level applied to its anode electrode and the diode is forward biased into conduction. Accordingly, the voltage level at the base electrode of transistor 630 is more positive than the voltage level at the base electrode of transistor 628.

The voltage levels applied to the base electrodes of the transistors 628 and 630 are applied through zener diodes 644 and 634 to the base electrodes of the transistors 638 and 640. The voltage source −V together with the resistors 646 and 648 bias the zener diodes so that each diode provides a predetermined voltage change. In the present embodiment, the zener diodes are biased to provide a ten volt change or voltage drop which corresponds to their zener breakdown. The value of current flowing through the zener diodes is of a magnitude such that the diodes do not switch with changes in current and remain in their zener breakdown region. Therefore, the base electrode of transistor 638 is less positive than the base electrode of transistor 640. These differences in voltages between the pairs of transistors result in transistors 628 and 640 conducting which forces current into terminal 151a and permits current from terminal 151b to pass through transistor 640. Stated differently, the driver 152 applies a positive voltage signal level to terminal 151a and a negative voltage signal level to terminal 151b.

When the voltage level applied to the same data terminal is forced low or to a binary ZERO, then the voltage signal level at the junctiom 605 is forced high. This prevents current from flowing through resistor 642 and in turn increases the voltage signal level applied to the diode network sufficient to forward bias diode 624 into conduction. Now, the voltage level at the base electrode of transistor 628 is more positive than the voltage level at the base electrode of transistor 630. Similarly, the voltage change is applied through the zener diodes 644 and 634 which places the base electrode of transistor 638 at a voltage level more positive than the level applied to the base electrode of the transistor 640.

Under the above conditions, transistors 630 and 638 conduct with current being forced into terminal 151b and current from terminal 151a being permitted to pass through transistor 638. Stated differently, the driver 152 applies a positive voltage level to terminal 151b and a negative voltage level to terminal 151a.

In summary, when a binary ONE level is applied to one of the terminals 153a or 153b, the driver circuit 152 applies positive and negative voltages respectively to output terminals 151a and 151b. Alternatively, when binary ZERO levels are applied to both the terminals 153a and 153b, the driver circuit 152 applies negative and positive voltage respectively to the output terminals 151a and 151b.

The transistors 628, 630, 638 and 640 and their respective current sources are biased for linear operation thereby minimizing switching time delays. Since the zener diodes provide equal values of voltage drops notwithstanding changes in current, the voltage differences between the base electrodes of each of transistor pairs 628 and 638 and 630 and 640 are established by the forward voltage drops of diodes 624 and 626. This arrangement enables fast switching through diodes 624 and 626 which provide signals with sharp rise time characteristics. This in turn reduces to a minimum the cross over distortion at the zero volts or cross over points of the output voltage waveforms applied to terminals 151a and 151b.

RECEIVE SECTION

Figure 3B:
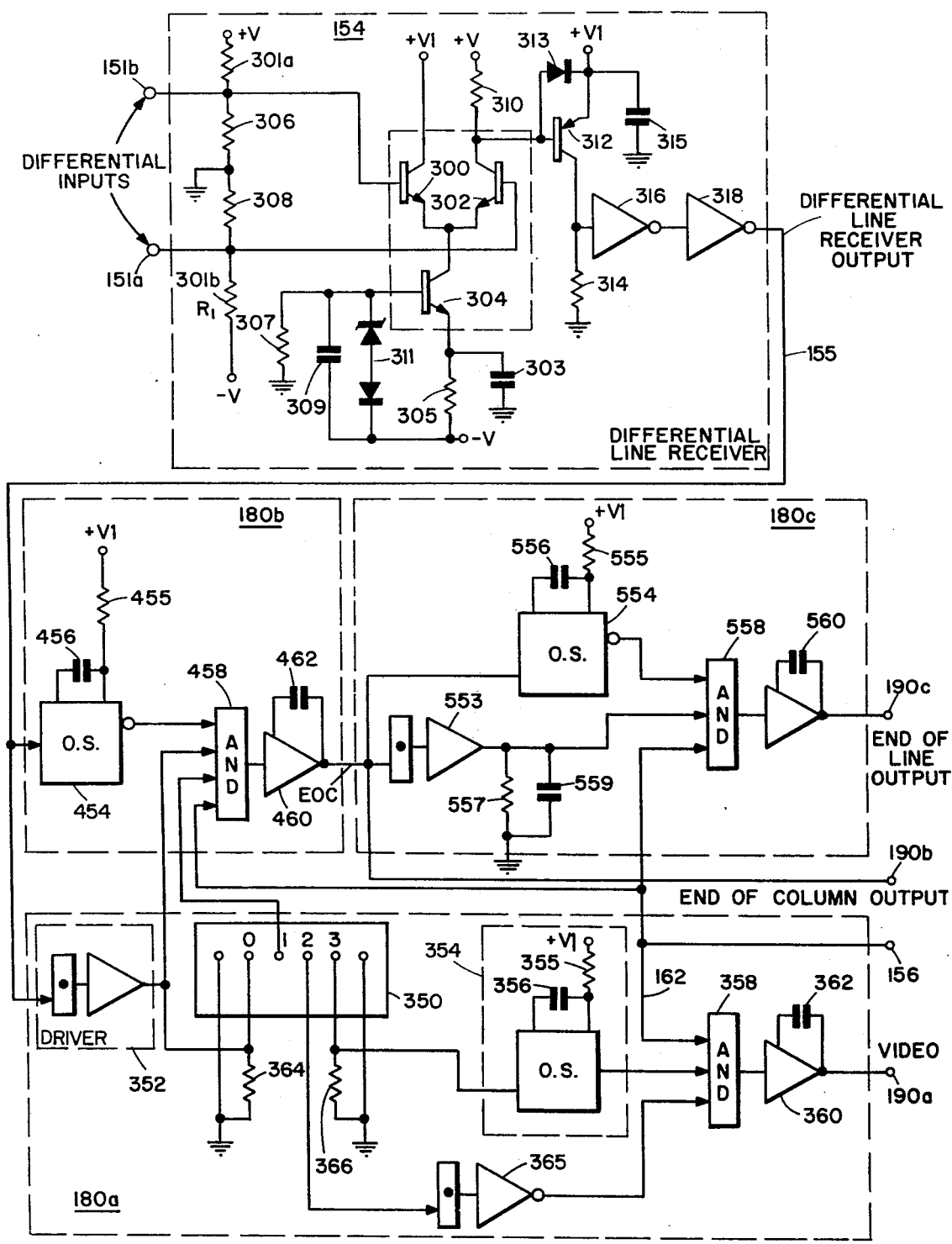
FIG. 3b shows in greater detail the blocks of receive section of FIG. 2.

FIG. 3b shows in greater detail, the receive section 100R of unit 100. Since the receive section 200R of unit 200 is organized like the receive section 100-R, it will not be described herein.

RECEIVER CIRCUIT

The receiver circuit 154, as shown, includes a differential input provided by a pair of transistors 300 and 302. These transistors have their emitter electrodes connected in common to a current source. The current source comprises a transistor 304, resistors 305 and 307, by pass capacitors 303, 309 and a diode network 311 arranged as shown.

The data input is applied across terminals 151a and 151b which connect to the base electrodes of transistor 300 and 302 respectively. A pair of resistors 306 and 308 having equal resistive values terminate the source of data, here cable 120, in its characteristic impedance. Each of the resistors 306 and 308, as shown, connect through resistors 301a and 301b respectively to biasing voltage source +V and −V applied to terminals +V and −V.

In the absence of an input voltage level applied to terminals 151a and 151b, transistor 300 is conducting and transistor 302 is held nonconductive. When a voltage level is applied to the base electrode of transistor 302 which is more positive than the level applied to the base electrode of transistor 300 (i.e. a voltage level corresponding to a binary ONE), transistor 302 switches into conduction. The current flowing from a voltage source +V, through a collector load resistor 310 and through the collector-emitter path of transistor 302, reduces the voltage level at the collector electrode of transistor 302 to a less positive voltage level. This voltage decrease forward biases the emitter to base junction of an output transistor 312 whereby transistor 312 conducts into saturation. The current flowing through transistor 312 produces voltage level across collector load resistor 314 which is representative of a binary ONE. This binary ONE output is applied to output line 155 through a pair of series connected inverter amplifier circuits 316 and 318, conventional in design.

Conversely, when a voltage level applied to the base electrode transistor 302 is more negative than the voltage level applied to the base electrode of transistor 300 (i.e. a voltage level representative of a binary ZERO), transistor 300 switches into conduction. Current flows from a voltage supply terminal, +V1, through the collector to emitter path of transistor 300. Accordingly, the voltage level at the collector electrode of transistor 302 rises to a voltage level which approximates the sum of the voltage applied to terminal, +V1, and the voltage drop across diode 313. The conducting diode 313 reverse biases the base to emitter junction of output transistor 312. Accordingly, transistor 312 becomes nonconductive. This decreases the output voltage developed across resistor 314 to approximately ZERO volts. This output is then applied through inverter amplifiers 316 and 318 to line 155.

In summary, the receiver circuit 154 is operative to generate a logic output level on line 155 in response to voltage levels applied to its differential input from cable 120. As illustrated by FIG. 3, this logic output is applied to three detector circuits 180a, 180b, and 180c, each of which also receive a further logic level in the form of a control signal via a line 156.

Detector 180a

The detector circuit 180a operates to detect keyboard data and video information which is encoded to have maximum pulse widths of 140 nanoseconds at maximum repetition rates of 3.77 MHz and rejects pulses having widths equal to or greater than 330 nanoseconds at a maximum repetition rate of 2.1 MHz. This operating region for the detector 180a is defined by the lines 402, 404 and 415 of FIG. 4.

Referring to FIG. 4, it will be noted that the detector 180a may reject or pass pulses having widths between 140 nanoseconds and 330 nanoseconds. However, this is defined as an illegal region of operation in FIG. 4.

Because the different types of digital information are encoded only with pulse widths selected from predetermined regions which can be separated from one another by an illegal region, the detectors can reliably discriminate between the pulse widths of the different types of information notwithstanding distortion and noise.

Referring to FIG. 3b, it wll be noted that a multi-terminal delay line 350 and driver circuit 352, shown as part of detector 180a, constitute a substantial portion of the receiver section. The remaining detectors circuits 180b and 180c in effect share the delay line 350 by utilizing directly or indirectly, outputs from the delay line terminals to separate its respective type of digital information from the input stream of digital information applied via cable 120. A pair of resistors 364 and 366 terminate each end of the delay line 350 in its characteristic impedance.

The detector 180a further includes a one shot circuit 354, an inverter circuit 365, and AND gate 358 and amplifier 360. The pulse width for one shot circuit 354 is established by external capacitor 356 and resistor 355. In the illustrated embodiment, these elements are selected to provide a 100 nanosecond output pulse.

Each of the above mentioned circuits are for the purpose of the present invention conventional in design and for that reason will not be described in further detail herein. For additional information regarding amplifiers inverters, etc., reference may be made to the text titled "Pulse, Digital and Switching Waveforms" by Millman and Taub, McGraw-Hill Book Co., Inc., Copyright 1965.

In greater detail, the delay line 350 provides various delays at its multi-output terminals and these delays for the various outputs are listed in the table herein.

ing delays for inverter 365 and one shot circuit 354 have been combined to obtain the other values designed in the other waveforms.

Figure 5:
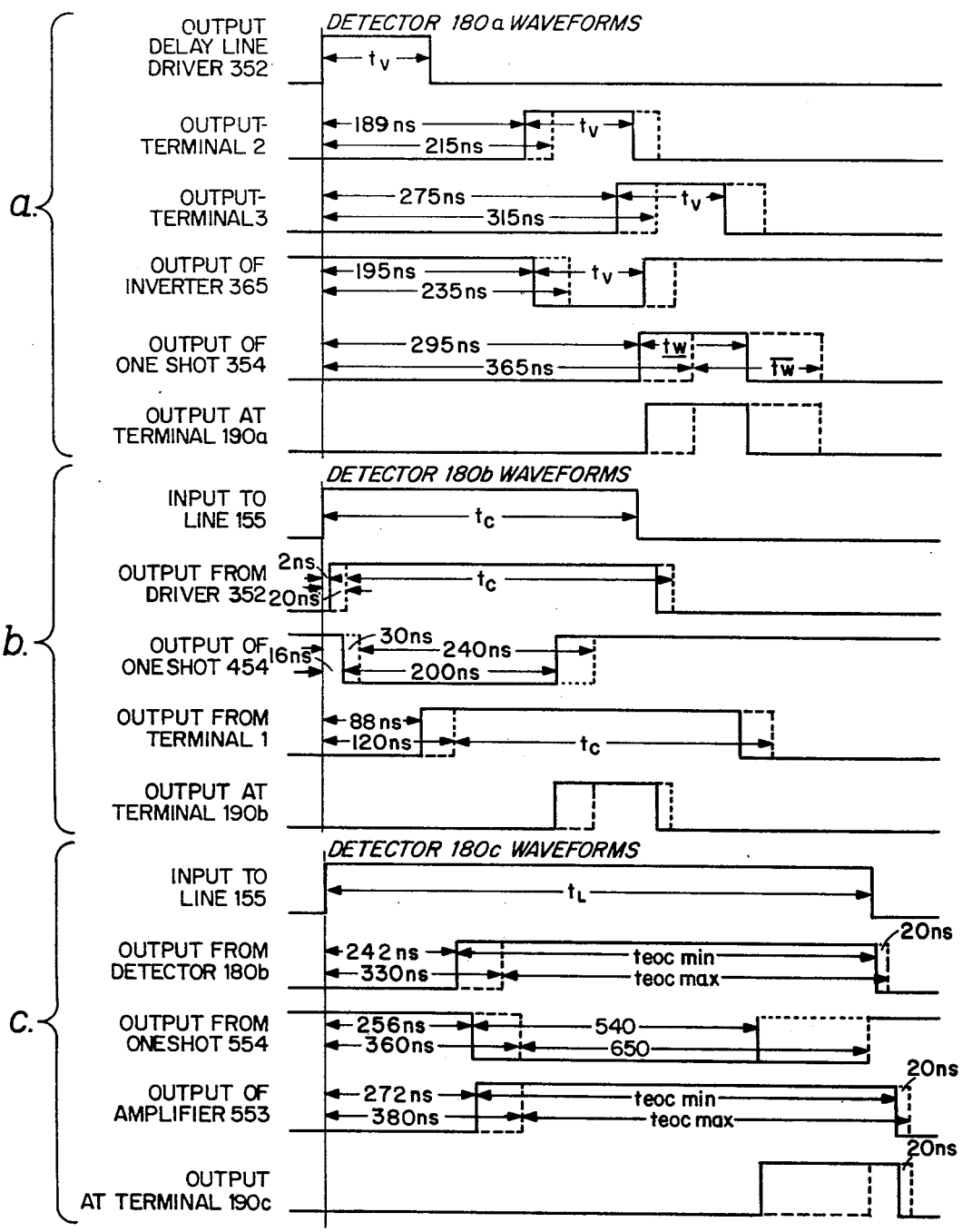
FIG. 5 is a group of waveforms present at various points within the detectors of FIG. 3; and, FIG. 6 is a diagram illustrating the types of digital information signals transmitted between the devices in the system of FIG. 1.

From the waveform of FIG. 5a, it will be noted that the maximum pulse width ($tv$ max) the detector 180a will pass is defined by the minimum trailing edge of one shot pulse ($tw$) and maximum trailing edge of inverter 365 pulse. With gating delays of 20 nanoseconds and a one shot pulse width of 100 nanoseconds, $tv$ max. = (295 + 100) − 235+20 = 140 nanoseconds. The maximum repetition rate of pulses the detector 180a can pass corresponds to 1/(the difference between the maximum trailing edge of one shot pulse ($tw$) and the minimum leading edge of the inverter 365 pulse). Hence, $F$ max = 1/(365+ 100 − 195) nanoseconds = 3.77 MHz.

Also, it may be seen from the waveforms of FIG. 5a, the minimum pulse ($tv$ min.) that the detector 180a can totally reject notwithstanding maximum delays is defined by the maximum trailing edge of one shot pulse ($tw$) and the minimum leading edge of inverter 365 pulse plus assumed maximum circuit delays of 60 nanoseconds. The $tv$ min. = 465 − 195 + 60 = 330 nanoseconds. And, the maximum repetition rate the detector 180a can reject $Fr$ max. approximates the minimum width for pulse ($tv$) plus the maximum time before a next pulse occurs. The value $Fr$ max. = 1/(330 + 150) = 2.1 MHz. It will be noted from FIG. 4 that the above calculations ilustrate that the detector 180a operates reliably within the region selected for this type of digital information. That is, the detector 180a passes pulses having widths of 140 nanoseconds or less notwithstanding maximum variations in the elements which comprise the detector.

Detector 180b

| DELAY LINE OUTPUT TERMINALS | DELAY TIME IN NANOSECOND | | | RESPONSE TIME IN NANOSECONDS | | |
|---|---|---|---|---|---|---|
| | MIN. | NORM. | MAX. | MIN. | NORM. | MAX. |
| | 78 | 83 | 88 | 8 | 10 | 12 |
| 2 | 177 | 187 | 197 | 12 | 16 | 18 |
| 3 | 262 | 277 | 292 | 13 | 18 | 23 |

When an output pulse is applied to line 155, the line driver 352 is conditioned to apply this pulse to the input terminal of the delay line 350. This pulse is delayed by delay line 350 by a predetermined amount (i.e. 188 nanoseconds) and then applied from a further terminal (i.e. terminal 2) to the inverter 356. Also, delay line 350 further delays the input pulse by an amount corresponding to its maximum delay of 277 nanoseconds and applies then this output pulse from terminal 3 as an input to the one shot circuit 354. The leading edge of the delayed output pulse triggers the one shot circuit 354 which in turn produces an 100 nanosecond width output pulse. The output pulse of the one shot circuit 354 together with the output of inverter 365 are logically combined by AND gate 358 so as to only produce a positive going output pulse only in response to a first type of digital information (i.e. video or column information encoded with the above pulse widths).

FIG. 5a shows the waveforms at the various points within the detector 180a. The minimum and maximum values for the delay line waveforms have been calculated from the values given in the previously discussed table. Also, minimum and maximum values of switch- This detector is operative to detect digital information such as a keyboard generated strobe signal or other information signals which are encoded to have minimum pulse widths of 330 nanoseconds at maximum repetition rates of 2.1 MHz. The allowable region from which pulse widths can be selected for this encoded digital information is defined by lines 406, 408 and 415 in FIG. 4.

The detector 180b shares the delay line 350 and the delay line driver 352 of detector 180a. Additionally, the detector 180b includes a one shot circuit 454, and AND gate 458 and an amplifier 460 connected as shown. These circuits may be implemented in a manner identical to those of detector 180a. It will be noted that the one shot circuit 454 includes an inverter circuit, not shown, to produce the negation of the output pulse it generates.

In operation, receiver circuit 154 in response to an input applies an output to line 155, the leading edge of which fires the one shot circuit 454 which generates an output pulse of a 220 nanosecond pulse width. The negation of this output pulse, as indicated by a circle at the output of one shot circuit 454 of FIG. 3, is applied as an input to the AND gate 458. The input pulse applied along 155 also activates delay line driver 352 which in turn applies to this pulse to the input of the delay line 350 and to AND gate 458. The delay line 350 delays the input pulse by a predetermined amount (i.e. 83 nanoseconds) and then applies it through another one of its terminals (i.e. terminal 1) to AND gate 458.

When the input pulse has a pulse width of 330 nanoseconds or more, the detector 180b generates an appropriate positive going output pulse representative of a second type of information (i.e. strobe or end of column information) at the output of amplifier 460. This output is produced by ANDing the outputs of one shot circuit 454, output pulse applied to line 155 from delay line driver 352 together with a delay version of the same signal applied from terminal 1 of delay line 350.

The various output waveforms these points within detector 180b are illustrated in FIG. 5b.

As described with respect to FIG. 5a, the values for the waveforms are obtained by summing the maximum and minimum delays through the various elements. These elements include driver 352 one shot 454, and the delay line 350. The minimum width pulse ($tc$ min.) the detector 180b can pass is defined by the minimum trailing edge of driver 352 pulse and the maximum trailing edge of one shot 454 pulse plus assumed delays. Thus, $tc$ min. $= 60 - 2 + (30 + 240) = 328$ nanoseconds or 330 nanoseconds.

The maximum repetition rate the detector 180b can pass is $F$ max. $= 1/(tc$ min. $+$ settling time$) = 1/(330 + 150) = 2.1$ MHz. The pulse width ($tcr$) that the detector 180b can totally reject is defined by the difference between the maximum trailing edge of the driver 352 pulse and the minimum trailing edge of one shot 454 pulse plus the delay in gating. In particular, $(200 + 16) - (tcr + 20) = 46$ or $tcr = 150$ nanoseconds. And, the maximum repetition rate which the detector 180b can reject is $fr$ max. $= 1/$maximum leading edge of terminal 1 pulse $+$ pulse width $tcr$). Therefore, $Fr$ max. $= 1/(120 + 150) = 3.77$ MHz. From FIG. 4, it will be noted that the above calculated values indicate that the detector 180a operates reliably in the region indicated. That is, the detector 180b passes pulses having widths of 330 nanoseconds or greater and reject pulse widths of 150 nanoseconds or less notwithstanding maximum circuit delays. Accordingly, the detector 180b with a high degree of reliability passes pulses having widths of 330 nanoseconds or greater.

Detector 180c

The detector circuit 180c is arranged to detect information signals encoded to have pulse widths of 1040 nanoseconds with repetition rates of up to 840 KHz. At the same time, the detector circuit rejects pulse widths of 685 nanoseconds or less. This region of operation for detector 180c is defined by lines 410 and 415 in FIG. 4. The region defined by lines 408 and 410 is an illegal region of operation for this detector.

The detector, as shown in FIG. 3, shares the circuits of the previous detector circuit 180b along with the delay line 350 and driver 352. In addition, the detector 180c includes a one shot circuit 554, an AND gate 558, and amplifiers 553 and 560 connected as shown. These circuits also may be implemented in a manner identical to those of detectors 180a and 180b.

In operation, when the leading edge of the detector output of the previous stage 180b is applied at the output of amplifier 460, it fires the one shot circuit 554 which in turn produces the pulse 600 nanoseconds in width. As indicated by the circle, the negation of the one shot 554 output waveform is applied as an input to AND gate 558. Additionally, the output of amplifier 460 of the previous detector stage 180b is also applied through amplifier 553 to AND gate 558.

The ANDing of the outputs from one shot circuit 554 and amplifier 553 bus AND gate 558 produce an appropriate output positive going pulse representative of a third type of information (i.e. function or end of line information) when the width of the input pulse is 1040 nanoseconds or greater.

The waveforms at the various points within detector 180c are illustrated in FIG. 5c. For detector 180c, the values of the waveforms are obtained from the detector 180b waveform (i.e. referenced as $teoc$), delays for one shot 554 and amplifier 553. The minimum pulse width ($tl$ min.) that detector 180c can detect is defined by the difference between the minimum trailing edge of the amplifier 553 pulse and the maximum trailing edge of one shot 554 pulse plus switching delays. That is, $272 + (tl$ min. $- 240) - (360 + 650) = 60$. And, $tl$ min. $= 1040$ nanoseconds. The maximum repetition rate $F$ max. that the detector 180c will pass $= 1/(1040 + 150) = 840$ KHz. Also, the pulse width ($tlr$) the detector 180c can totally reject is defined by the difference between the minimum trailing edge of one shot 554 pulse and the maximum trailing edge of amplifier 553 pulse plus delays. Therefore, $(240 + 16 + 540) - (380 + tlr - 330) = 60$. And, $tlr = 685$ nanoseconds. The maximum repetition rate which the detector 180b can reject is $Fr$ max. $= 1/($one shot and gate delays $+$ settling time$) = 1/(50 + 150) = 5$ MHz. As illustrated by FIG. 4, the detector 180c passes pulses having widths of 1040 nanoseconds or greater and rejects totally pulse widths of 685 nanoseconds notwithstanding maximum circuit delays.

By way of illustration only, a system according to the present invention operated sucessfully with the component values shown below. These values are only illustrative and should not be construed in any way as limiting with respect to the present invention.

TABLE

| | |
|---|---|
| Resistors | |
| 301a, 301b | 30 kilohms |
| 305 | .490 kilohms |
| 306, 308 | .047 kilohms |
| 307 | .510 kilohms |
| 310 | .820 kilohms |
| 314 | .240 kilohms |
| 455 | 30 kilohms |
| 555, 355 | 20 kilohms |
| 557 | .300 kilohms |
| 364, 366, 603 | .240 kilohms |
| 612 | .560 kilohms |
| 614, 618, 654 | .330 kilohms |
| 616 | .270 kilohms |
| 652, 622 | .150 kilohms |
| 642 | .075 kilohms |
| 646, 648 | .910 kilohms |
| 656 | .200 kilohms |
| Capacitors | |
| 303 | 470 picofarads |
| 309, 315 | .100 microfarads |
| 356, 456 | 5.1 picofarads |
| 162, 462, 560, 362 | 22 picofarads |
| 556 | 62 picofarads |
| 559 | 47 picofarads |
| Voltage Source | |
| +V | 15 volts |
| +V1 | 5 volts |
| −V | −15 volts |
| Delay Line | |

| | |
|---|---|
| 350 | Bel Fuse BF-14-551 |

SYSTEM OPERATION

The system operation with reference to FIGS. 2, 3 and 6, together with an example of how the present invention may be incorporated in the system of FIG. 1 for accommodating bidirectional transmission of different types of digital information will now be given.

General

In operation, control information and video information may be transmitted from the cluster control unit 100 along cable 120 to the receiver section 200R of the CRT display unit 200. The detectors 280a, 280b, and 280c are operative to distribute the various types of digital information to the appropriate receiving units. For example, the output of the video detector 280a will be operative to distribute and video encoded information to the video processing circuits of the CRT unit.

In particular, the cluster control device 100 sends character information which the CRT unit 200 uses to control the generation of the character on its display screen. In the illustrated system, a dot matrix is used with the character generation generator technique. Accordingly, the cluster control device sends information indicating which dots will be illuminated in each column of a matrix. The selected dots form each character. In FIG. 6, this video information is pulse coded so as to appear as a series of 135 nanoseconds pulses in waveform c wherein the presence of a pulse indicates that the dot in that position is to be illuminated.

Additionally, the cluster control unit 100 provides control vide information which proceeds the column video pulses and is used by the deflection circuits of the display 200 for changing the direction of deflection during the character generation operation. This information is encoded to have a pulse width of 540 nanoseconds and is labeled "minor video column" in waveform C.

Also, the cluster control device is operative to send control information used by the video processing circuits for indicating when it has completed writing the end of a line of characters. This type of information is encoded to have a pulse width of 1080 nanoseconds and corresponds to the pulse labeled "end of the line pulse" in waveform C.

From the above mentioned three types of digital information, the CRT display unit 200 can derive additional information for accommodating the types of operations its video circuits must perform. For example, the CRT unit 200 can determine when the video circuits have completed writing a character on the display screen by simply counting the number of minor video column pulses of waveform c. Assuming a five by seven dot matrix, these circuits upon having received six minor video column pulses (5 for each column and one for return) can determine when it has written a character. Thus, the first three groups of pulses will cause the CRT unit 200 to generate a video character and return the character trace to its original position to process a next character.

In addition to the above mentioned video data and control information, the cluster control device also may send status information indicating the operational status fo the CRT display unit at any given time period. For example, normally the CRT unit 200 includes a number of status indicator lights such as, wait, proceed, print, stop, etc. Since this information must be updated periodically as a result of actions by the central processing unit, the cluster unit normally transmits status information once each frame or page. The status information is pulse coded for each indicator light as a presence or absence of pulses (binary ONE or ZERO respectively) and these pulses correspond to the pulses between larger pulses labeled status strobe pulses in waveform C. It will be appreciated that the cluster control normally supplied this string of timing pulses within a time period corresponding to the retrace time for that line. The CRT unit upon receipt of these pulses processes the status information and applies the binary ONES and ZEROS to the appropriate indicator lights so as to display the latest status information.

It will be appreciated that when the cluster control device has completed its transmission of video or a page, the CRT unit 200 may then enter data. The CRT unit determines the appropriate time for entering data on a per page basis by recognizing when the unit receives the last line of video information transmitted by the cluster control device. This time period is determined by logic (not shown) in the CRT unit which detects having received a pulse sequence wich includes an end of line pulse together with status information pulses (i.e. pulse of 1080 nanoseconds followed by 405 nanosecond pulses). This logic sets an appropriate function whereafter upon a receipt of the last EOL pulse, the CRT unit is operative to condition its transmit section 200T for transmitting data. At this time, the CRT unit provides the timing strobe pulses to cable 120. And, it inserts the data bits of a full in pulse coded form between these pulses. That is, a pulse is inserted for each binary ONE bit and no pulse is inserted for a binary ZERO. Thus, the CRT unit is operative to supply timing pulses once per page (i.e. once every 60 hz together with single character. It will be appreciated that this transmit rate (i.e. 60 characters per second) is sufficient to accommoate maximum typing speeds.

Operation

Referring now to FIG. 6, a typical sequence of operations will now be described with reference to this figure. First, it will be assumed that the cluster control device 100 has commenced its transmission of the video dot information for a last column of a video character. This produces the seven pulses of waveform A each having width of 135 nanoseconds. Since there are seven pulses, all dots in that column for that character will be illuminated.

As shown by FIG. 6, prior to transmitting the seven pulses, the cluster control unit inserts a medium width pulse corresponding to the minor video column pulse which indicates the change of direction in the deflection of the CRT display for waiting another column. This pulse appears as a first pulse of waveform D. Waveform A and waveform B appear as separate inputs to the driver 152 of transmit section 100T of the cluster control unit. The driver 100T applies the composite output labeled as waveform C to cable 120. It will be appreciated that previously the cluster control unit has enabled and disabled respectively the transmit and receive section 100T and 100R by applying a binary ZERO voltage level to line 156.

The above mentioned signals of waveform C are transmitted along cable 120 to the receive section 200R of the CRT unit 200. The line receiver circuit 254 is operative to apply these pulses to detectors 280a, 280b, and 280c.

With reference to FIG. 3b, the AND gate 458 of detector 280b receives the 540 nanosecond input column pulse whose leading edge causes the one shot circuit 454 to generate a 220 nanosecond pulse the inversion of which is applied as another input to the AND gate together with the delayed version of said input pulse applied from delay terminal 1 of delay line 350. Since the detector 180b operates to pass pulse widths greater than 330 nanoseconds, the delayed received pulse width overlaps the negation of the output provided by the one shot circuit 454 (see FIG. 5b). Accordingly, the result of ANDing these two pulses produces an output pulse at terminal 290b of a width corresponding to the first pulse of waveform E of FIG. 6. The column pulse is followed by the seven video pulses which the detector 180a is operative to pass to its output terminal 290a.

As mentioned previously, the cluster control unit 100 is operative to send a pulse coresponding to the End Of Line pulse of waveform C. As shown, by FIG. 6, this pulse is elected to have a pulse width of 1080 nanoseconds. This pulse is also received by the receiver circuit 254 and applied to the input of the aforementioned detector 280b. Because the width of this pulse exceeds the width of pulses detected by this detector, it appears at the output 290b.

Referring to FIG. 3b, it wll be seen that the pulse from detector 280b is thereafter applied to the AND gate 558 of detecor 280c. Because the width of this is greater 1040 nanoseconds, the outputs from one shot circuit 554 and amplifier 553 when "ANDED" cause gate 558 to become active thereby producing the pulse labeled as EOL in waveform F of FIG. 6.

While the CRT unit is processing the aforementioned video information, the cluster control device 100 will then generate the series of timing pulses, labeled as status strobe in waveform C, for inserting the pulse coded status information therebetween. That is, the cluster control device 100 inserts a pulse in each position where the indicator light is to be switched to an on state.

The receiver circuit 254 of the CRT unit 200 upon receiving the transmitted pulses becomes operative to pass the series of status strobe pulses and status bit pulses along line 255 to the detector circuits 280a, b and c. It will be noted, as indicated by waveform D of FIG. 6, that the status information pulses encoded with the pulse width of 135 nanoseconds also appear at the output 290a of detector 280a. Since this is the same output which normally supplies video information to the CRT display unit, logic, not shown, contained within the CRT unit separates the status information from the video information. In particular., this logic would become operative upon being conditioned by the receipt of an End of Line pulse to transfer the subsequently detected status information pulses to an output separate from the video output 290a. It wll be appreciated that this logic is very simple in design and could include a single AND gate enabled by the "ONE" output terminal of a flip-flop when it is switched to its ONE state by the aforementioned EOL pulse.

Additionally, the detector 280b is also operative to pass the strobe timing pulses encoded with pulse widths of 405 nanoseconds to its output 290b illustrated by waveform E of FIG. 6. These timing pulses may be used to store the pulse coded status bits applied to output 290a. Once stored, these status bits illuminate the appropriate indicator lights of the CRT unit.

Subsequent to the receipt of status information, the CRT unit 200 will be enabled after the receipt of video for the last line of a page (i.e. upon receipt of the second End Of Line pulse) to transmit a data character entered from the keyboard input of FIG. 2. It will be appreciated that notwithstanding the availability of a data character, the CRT unit 200 will be operative to generate the timing input pulses (i.e. status strobe pulses) such as those in waveform C discussed above. However, during the generation of status timing pulses, when there is a character stored the bits comprising the data character are inserted or not inserted between successive timing pulses so that each pulse coded bit of information is bracketed by a pair of timing pulses. This arrangement facilitates recovery of the information bits notwithstanding large phase shifts etc. produced by transmitting these pulses along cable 120.

While not shown in FIG. 6, the timing strobe pulses and bits of a character which will appear similar to the last group of pulses, are transmitted along cable 120 when the CRT display applies an appropriate voltage level to line 256. The driver circuit 253 is then enabled to transmit the above mentioned pulses. Simultaneously therewith the detectors 280a through 280c of the receiver section 200R of unit 200 are disabled by the voltage level applied to line 256.

It will be appreciated that logic, not shown, included within the cluster control device 100 of FIG. 2 will assemble the bits of the character transmitted by unit 200 in a storage register (not shown). At that time, the assembled character will be then decoded and determined to be either control character specifying a type of editing operation or a data character. Thereafter, the cluster control unit will transmit another page of video and control information.

In accordance with the subject invention, there has been described a technique for encoding different types of digital information with different pulse widths. It will be appreciated that while certain pulse widths have been assigned to define strobe and timing information and other pulse widths to define video and control information, the invention should not be interpreted as being so limited. Different pulse widths within the various established regions could have been assigned to the various types of digital information.

Further, while the invention is shown as providing regions of illegal operation several of the types of digital information that detectors could be arranged to provide a similar illegal regions of operation between the other different types of digital information where necessary. Additionally, it will occur to those skilled in the art that different detectors, driver circuits and receive circuits can be substituted without departing from the present invention.

It will also be appreciated that while the invention has been disclosed for use in a system which handles transfers between a centrally located cluster control device and a CRT display unit, the invention may be utilized in other types of systems. However, the concept of the present invention is used to best advantage where the system normally handles different types of information characters serially because the receiving device normally processes the various types of digital information sequentially.

While in accordance with the provisions and statutes, there has been illustrated and described the best form of the invention known, certain changes may be made in the elements described without departing from the spirit of the invention as set forth in the appended claims and that in some cases, certain features of the invention may be used to advantage without a corresponding use of other features.

Having described the invention, what is claimed as new and novel for which it is desired to secure Letters Patent is:

1. In a display system including a first unit for transmitting digital information including video character and control information signals to a second unit for use in a cathode ray tube display device, an interconnection system comprising:
   a bus directly coupling said first unit to said second unit;
   transmit means included within said first unit for applying said video character and control information signals to said bus, each different type of information being pulse coded into groups of coded pulses having the same pulse width with a predetermined one of a plurality of different pulse widths; and,
   receive means included within said second unit coupled to said bus for separating said video characters pulses and control pulses on the basis of their pulse widths from said information signals for distribution to a different predetermined one of a number of output terminals included in said device for subsequent processing by different portions of said display device.

2. The system of claim 1 wherein said receive means includes a plurality of detector means, each including input and output means, each of said input means being connected to receive said digital information pulses and each being operative to pass to each said output means only those pulses corresponding to said type of digital information characterized by said predetermined pulse widths.

3. The system of claim 2 wherein said receive means further includes delay means including an input terminal and a plurality of output terminals, each of said output terminals arranged to provide an output pulse delayed from the pulse applied to said input terminal by a different predetermined amount;
   each of said detectors including pulse generating means coupled to said detector input means and logic means coupled to predetermined ones of said delay means output terminals and to said pulse generating means, said pulse generating means being operative to generate a pulse having a predetermined pulse width in response to the leading edge of each pulse applied to said detector input and said logic means being coupled to be responsive to said pulses applied to said detector input means and the pulses produced by pulse generating means so as to logically combine them in a manner to pass only digital information pulses having predetermined pulse widths to said detector output means.

4. The system of claim 2 wherein said delay means includes a delay line.

5. The system of claim 3 wherein each of said logic means includes means for receiving a common control input for either enabling or disabling said detectors simultaneously for receive and transmit operations respectively.

6. The system of claim 3 wherein said logic means includes AND gates and said delay means includes a delay line.

7. The system of claim 1 wherein said first unit further includes receive means, said receive means including a plurality of detectors, each including input and output means, each of said input means being connected to receive said digital information pulses and each being operative to pass to each said output means only those pulses corresponding to said type of digital information characterized by predetermined pulse widths; and,
   said second unit includes transmit means for applying to said bus groups of digital data and timing pulses, each coded with different predetermined pulse widths after receiving said video information pulses from said first transmit means whereby said interconnection system provides for bidirectional transmission of said different types of digital information.

8. The system of claim 7 wherein at least first and second detectors of said plurality of detectors of said receive means are connected in series, said input means of said first detector being connected to enable to pass at least two different types of digital information to said second detector, said second detector input means being connected to enable said second detector to pass to said output means only a predetermined one of said two types of digital information.

9. The system of claim 8 wherein said receive means further includes delay means including an input terminal and a plurality of output terminals, each of said output terminals arranged to provide an output pulse delayed from the pulse applied to said input terminal by a different predetermined amount;
   each of said detectors including pulse generating means coupled to said detector input means and logic means coupled to predetermined ones of said delay output terminals and to said pulse generating means, said pulse generating means being operative to generate a pulse having a predetermined pulse width in response to the leading edge of each pulse applied to said detector input means and said logic means being coupled to be responsive to said pulses applied to said detector input means and the pulses produced by pulse generating means so as to logically combine them in a manner to pass only digital information pulses having predetermined pulse widths to said detector output means.

10. The system of claim 9 wherein each of said logic means includes means for receiving a common control input for either enabling or disabling said detectors simultaneously.

11. In a display control system including a cluster control device and at least one CRT display device an interconnection network comprising:
   first means included within said cluster control unit for transmitting and receiving signals to and from said control unit, said first means including a transmit section (T-100) having a plurality of inputs and at least one output and a receive section (R-100) having at least one input and a plurality of output terminals;

second means included within said display unit for transmitting and receiving signals to and from said display unit, said means including a transmit section (T-200) having a plurality of inputs and at least one output and a receive section (R-200) having at least one input and a plurality of outputs; a twisted conductor means for directly interconnecting said first means and second means, said first means being enabled by said cluster control unit to condition said transmit section (T-100) to transmit different types of digital information signals including pulse coded video character information and at least two types of pulse coded video control information encoded into groups of coded pulses with different pulse widths the pulses within each group having the same predetermined pulse width in a predetermined sequence and, said second means being enabled by said display unit to condition said receive section (R-200) to detect said video character and video control digital information signals on the basis of pulse widths and distribute said groups of pulses corresponding to each type of information to a predeterined one of said output terminals.

12. The system according to claim 11 wherein said CRT display unit in response to a predetermined type of said video control digital information indicating the end of said information transfer is operative to condition said second means to disable said receive section (R-200) and enable said transmit section (T-200) to transmit timing pulses together with pulse coded bits of a keyboard entered character when stored, each being encoded into groups of pulses with different pulse widths and said cluster control unit being operative to condition said first means upon having transmitted said predetermined type of said video control digital information to disable said transmit section (T-100) and enable said receive section (R-100) to detect said groups of pulses corresponding to said keyboard entered digital information and timing information on the basis of said pulse widths and distribute each type of digital information to a predetermined one of said output terminals for subsequent processing by said cluster control device.

13. In a digital display system including a transmitter station for transmitting digital coded information coded with different pulse widths so as to define video information and at least first and second kinds of control video information, and a receiver station for supplying each different type of digital information signals to different portions of a CRT display unit, an interconnection network comprising:

a bus directly coupling said transmitter station to said receiver station; and said receiver station including a plurality of detectors, each detector including input means and output means, each of said input means being connected to receive said digital information encoded into groups of coded pulses having the same predetermined pulse width within a range of pulse widths, said pulse width of said first and second kinds of control information each having different ranges of pulse widths, each of said detectors including pulse generating means for generating a pulse whose width defines the type of digital information being detected by the detector selected to process same and, each of said detectors including means for comparing said generated pulse with the transmitted digital information pulses so as to produce a signal at said output means only in response to digital information pulses whose width is within the range of pulse widths characteristic of said type of information detectable by said detector.

* * * * *